United States Patent [19]

Minear et al.

[11] Patent Number: 4,947,683
[45] Date of Patent: Aug. 14, 1990

[54] PULSED ULTRASONIC DOPPLER BOREHOLE FLUID MEASURING APPARATUS

[75] Inventors: John W. Minear; Randy Gold, both of Houston, Tex.

[73] Assignee: Halliburton Logging Services, Inc., Houston, Tex.

[21] Appl. No.: 389,134

[22] Filed: Aug. 3, 1989

[51] Int. Cl.⁵ .............................................. E21B 47/10
[52] U.S. Cl. ..................................... 73/155; 73/861.25
[58] Field of Search ...................... 73/155, 151, 861.25, 73/61 R

[56] References Cited

U.S. PATENT DOCUMENTS

| | | | |
|---|---|---|---|
| 4,413,531 | 11/1983 | Karplus et al. | 73/861.25 |
| 4,433,573 | 2/1984 | Hulin | 73/155 |
| 4,452,077 | 6/1984 | Siegfried, II | 73/155 |
| 4,527,425 | 7/1985 | Stockton | 73/155 |

Primary Examiner—Hezron E. Williams
Assistant Examiner—Kevin D. O'Shea
Attorney, Agent, or Firm—William J. Beard

[57] ABSTRACT

A measuring device for use in a producing well is set forth. It includes a sonde having upper and lower centralizers to define an annular flow space therearound. In the preferred embodiment, a motor driven sensor preferably a piezoelectric combination transmitter and receiver is, included to transmit and then receive ultrasonic pulses. They are transmitted downwardly from the housing into fluid flowing in the well. Reflective interfaces are defined by material differences. Gas bubbles droplets and particles in the fluid flow and phases between oil and water, etc. form reflective interfaces to create a scattering effect to transmitted ultrasonic pulses so that a return pulse is formed. The pulses encodes fluid flow velocity as a result of the Doppler shift.

17 Claims, 2 Drawing Sheets

PULSED ULTRASONIC DOPPLER BOREHOLE FLUID MEASURING APPARATUS

BACKGROUND OF THE DISCLOSURE

It is often necessary to measure the rate of flow of fluid in a borehole. The present apparatus is an ultrasonic Doppler measuring device providing a fluid velocity measurement of fluid in a borehole. Consider a typical example in which a cased well has been produced for some period of time. Assume further that it may span two or three different horizons having perforations and potentially producing fluids into the borehole. It is necessary to measure the volume of the fluid flowing from each set of perforations at the respective horizons. This can be typically compounded even further when the formations produce different fluids. Assume that one produces only petroleum products while another produces oil and water in a known ratio. Alternately, assume that one of the formations produces natural gas in a specified ratio. In such an example as this, the commingled fluids will flow upwardly in the cased borehole. Routinely, entrained bubbles are carried along with the fluid flow. The bubbles and fluid flow at rates which may be the same or different depending on a number of factors discussed below.

It is often desirable to measure the fluid flow velocity. One device used for this is a type of flow meter which has a propeller affixed to some kind of counting device. The velocity of the propeller driven by the fluid flowing past the measuring device defines the flow rate by measuring the velocity as the propeller is spun. This works in an acceptable range of minimum and maximum flow velocities, but it does not work well at every velocity. There are a number of factors which can obscure measurements and create difficulties in making the measurements.

The present apparatus is a system that can be used to measure fluid velocity in a variety of mixtures and circumstances. It is a system which especially responds to scattered droplets of gas entrained in the form of bubbles in the flowing fluid. Alternately, there are typically entrained particles such as mill scale or other solid particles such as sand from the formation. Whatever the source, there is a strong possibility that the fluid will be something other than a pure fluid. Consider as one example a well which produces natural gas commingled with other petroleum products. The entrained gas bubbles are carried along with the produced fluid and they may indeed even flow faster than the produced liquids. The bubbles add another form of interface which scatters ultrasonic energy, a feature exploited as described below.

The disclosure sets forth a pulsed ultrasonic Doppler system which takes advantage of scattering from droplets and other particles in the flowing fluid stream. It is a system ideally located at the lower end of a centralized instrument body located in a cased well borehole, and wherein the casing defines the fluid path for the mixture of fluids flowing up the well. An instrument package of specified diameter is centralized by upper and lower sets of centralizers so that the fluid produced by the formation(s) flows up the casing and around the body which houses or holds the instrument described below. In this circumstance, it is possible to obtain the flow rate by directing an ultrasonic pulse from the measuring instrument downwardly into the fluid flow directed at the volume of fluid below the tool.

Pulses are formed at a selected repetition rate and have a short pulse duration; they are transmitted downwardly into the flowing fluid and impinge on reflective surfaces. Scattering occurs either by reflection or refraction. This involves the interface between various matrials making up the flow. For instance, droplets of oil and water will provide such an interface. Gas bubbles in an otherwise liquid flow will also provide an interface. Sand, mill scale and other particles of a solid nature also provide such an interface. The scattering has the form of a reflected signal after the transmitted pulse. It is therefore received at a time interval thereafter, and encodes the movement of the scattering particles in the fluid in the form of a Doppler shift. The Doppler shift can be measured and calibrated to obtain fluid flow velocity.

Several velocities may be involved in the relative measurement. For instance, the measuring tool can either be fixed or moving. The fluid can either be stagnant or moving. One ordinary circumstance will find the measuring tool moving downwardly while the fluid is flowing upwardly. The rate of movement of the measuring tool is normally obtained at the surface where it is measured as the logging cable for the measuring tool is lowered into the cased well, and that measurement can be readily subtracted from measurements of the fluid velocity relative to the tool. Alternately, the velocity of the tool relative to the stationary surrounding casing can be measured. In any event, such measurements can be made.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is an enlarged view of the transducer showing signal propagation and return.

DETAILED DESCRIPTION OF THE PREFERRED EMBODIMENT

Figure 1:
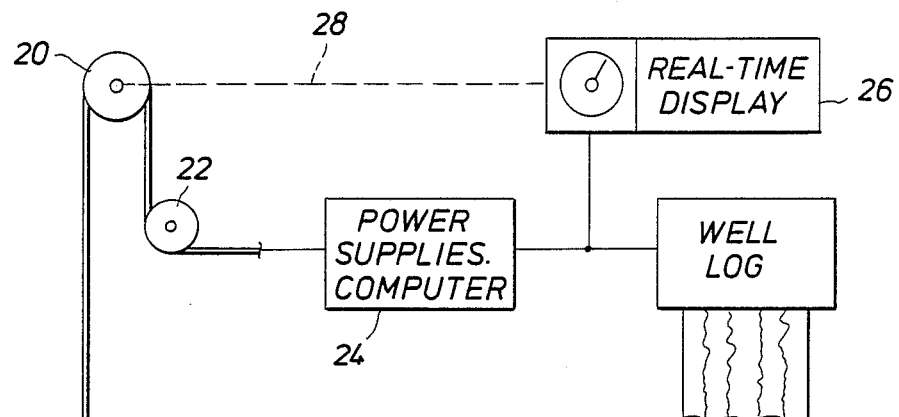
FIG. 1 shows the measuring instrument of the present disclosure suspended in a flowing well for making fluid flow velocity measurements.

Attention is directed to FIG. 1 of the drawings where the numeral 10 identifies the apparatus to the present disclosure. The sonde 10 is supported on a logging cable 12 extending into a cased well 14, the sonde being located in the center of the casing by lower and upper centralizers 16 and 18. The centralizers have the form of bow springs which are located around the periphery to enable centering of the sonde to thereby direct fluid flow pass the sonde in a surrounding annular flow space. The logging cable 12 extends to the surface where it passes over a sheave 20 and is directed to a drum 22 where it is spooled for storage. The cable can be several thousand feet in length. The are one or more conductors in the cable which connect with a surface located electronic system including a power supply and the various and controls for use of the sonde. In addition, the equipment at the surface connects to a recorder 26 which is provided with a depth measurement from a mechanical or electronic depth measuring apparatus 28 operative from the sheave. This enables the data to be recorded as a function of depth in the borehole.

The present apparatus is lowered to various depths in the well so that a formation 30 which produces fluid can introduce fluid flow below the sonde 10 where the fluid flows through a set of perforations at 32 into the well. The fluid flows upwardly and is produced from the wellhead. Typically, several perforations enable production of the fluid from the formation 30. Typically, the well will pass through one or more such producing formations. Indeed, it is possible to have fluid production from two or three different horizons along the depth of the well. In the latter instance, it is possible that the formations produce different volumes and perhaps different mixtures of fluid. As an example, assume that the formation 30 produces only oil. Another formation may produce a mixture of oil and water. Another formation may produce oil mixed with natural gas which is entrained as bubbles in the fluid production. It is not unusual for the formation to produce at least a measure of sand, and indeed, large volumes of sand may also be produced along with the production of the fluids.

The latter is mentioned as one example among many of the materials which flow with the formation fluids directed upwardly in the well and which flow around the sonde toward the surface. In the typical instance, production of mixed oil and water produces oil droplets entrained in the water as a result of the differences in surface tension between the two fluids. Alternately, natural gas bubbles may be produced and they are carried along with the fluid flow. It is useful to the present apparatus to note this mixture and to especially recognize that the interface between two of the materials serves as a reflective surface. Expanding on this thought, the interface between oil and water defines a reflective surface. In like fashion, the interface between the produced natural gas and the surrounding liquid that carries it is also such a reflective interface. Another example includes solid particles such as mill scale from the surface of the drill pipe making up the cased well. Other examples include the produced sand.

The foregoing variety of exemplary flowing materials points out something of the variety of flowing fluids which are measured by the present apparatus. The present apparatus is responsive to the reflective interfaces defined in the flowing materials. The reflective interface thus can have a large variety and can be, for example, the interfaces mentioned above and any other interface tending to reflect or refract ultrasonic signals transmitted through the flowing fluid. The flowing fluid is not simply a monolithic singular liquid (e.g., a specified weight of crude oil with various lighter and heavier constituents) but is in fact a mixture and especially a mixture having reflecting interfaces. So to speak, the reflective interfaces at or on grains of sand, gas bubbles, oil droplets entrained in water, etc. serve as a scattering reflective surface for purposes to be described.

Figure 2:
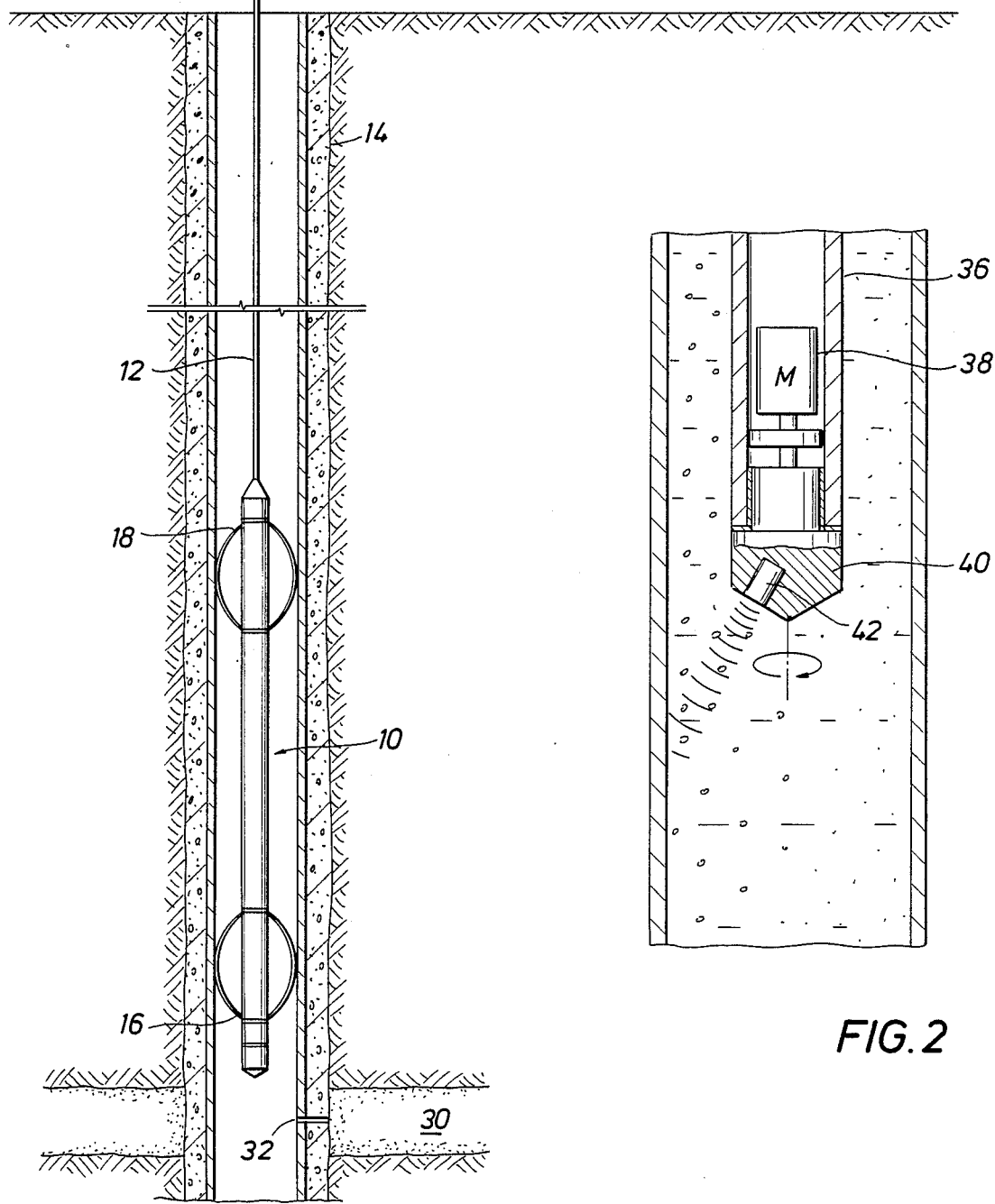
FIG. 2 is an enlarged detail view of the lower end of the tool shown in FIG. 1 illustrating details of construction of the ultrasonic pulse transmitter and receiver mechanism.

Attention is now directed to FIG. 2 in conjunction will FIG. 1. The lower portion of the sonde is constructed with a surrounding fluid tight housing 36. The housing 36 encloses the electronic package (not shown) which is provided to operate the transmitter described hereinbelow. Also, it encloses the receiver and the circuit for extracting the Doppler shift information as will be detailed. FIG. 2 further shows the housing 36 to have the form of an elongate tubular member which has an internal cavity for receiving a motor 38. The motor 38 is connected to suitable support mounting or bracket which holds the motor in position. The motor has a shaft which extends through a transverse bulk head to provide pressure tight isolation. Furthermore, the motor 38 is connected to a rotating hub 40 which is rotated at a controlled velocity by the motor. For instance, the rotational rate can be one turn per minute. This can be changed, that is speeded up or slowed down, by the incorporation of a gear box connected with the motor housing. In any event, the hub 40 serves as a mounting. It is shaped in the form of a tubular plug at the end of the cylindrical housing. An internal seal member is provided so that fluid from the exterior does not leak to the interior. Further the hub 40 supports a piezoelectric transmitting element 42. It is mounted in the body of the plug and has an exposed external face which is directed downwardly in the well to provide a transmitted ultrasonic pulse. The plug is rotated so that the ultrasonic beam described below sweeps across the cross sectional area of the pipe which makes up the well.

The ultrasonic transmitter 42 is an element which is installed having an exposed face directed somewhat downwardly. As shown in the drawings, it is directed downwardly at an angle of approximately 45° from the vertical. When rotated, it will sweep out a conic area which encompasses the entire cross sectional area of the pipe. It is possible to direct the beam downwardly at a different angle by positioning the transmitting antenna element at perhaps 15° to 30° from the vertical angle. It is important to direct the beam somewhat downwardly in the well. The interplay of this beam direction in conjunction with the flow path should be understood. Specifically, the sonde 10 is something of a plug or restriction placed in the well. It causes the flow to redirect into the annular space within the well and on the exterior of the housing 36. This speeds up the flow rate so that the flowing fluids pass around the sonde and thereby enhances the apparent relative velocity. It provides more of a contrast. It tends to cause a focused collection of bubbles and the like in the annular flow space so that there are more reflective particles, bubbles, etc. moving through the beam transmitted in the flowing well fluids. The precise position of the beam can be adjusted over a range so that the upward flow is correctly measured by reflecting from a sufficient number of bubbles that a meaningful response is obtained. Should there be absolute stillness, i.e. no flow, and should the fluid filling the well be without entrained particles droplets, etc., the ultrasonic beam will not have any scattering surface which reflects it. Fortunately, in the ordinary circumstances of use, the present apparatus practically always is able to obtain a responsive signal because, in practically every application, the fluid flowing past the measuring device will expose the flow and the entrained bubbles, reflected droplets, sand particles, etc. will be sufficient to create a back scatter and received ultrasonic signal.

Figure 3:
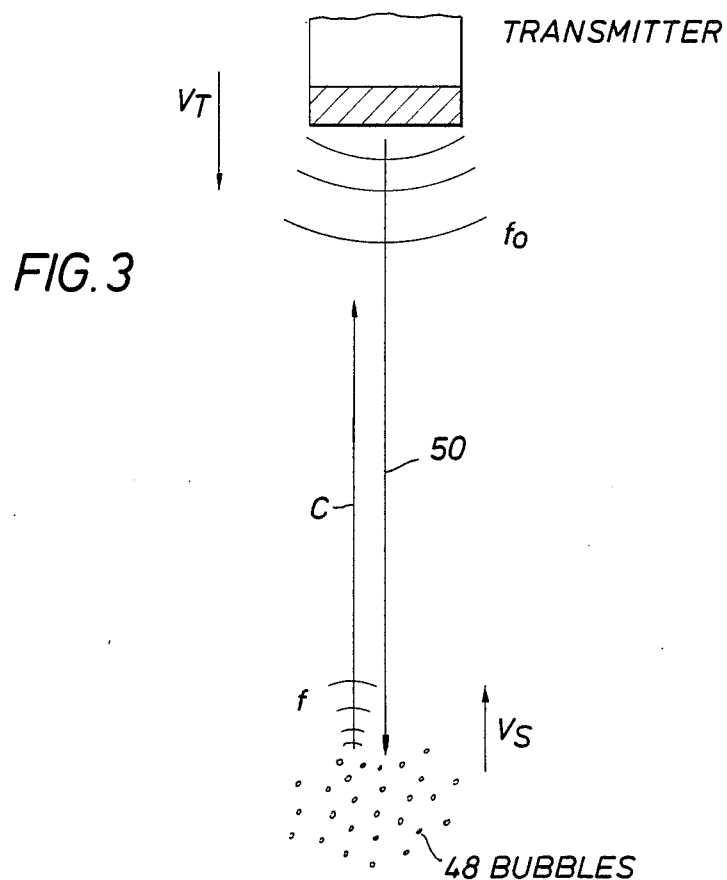

In FIG. 2 and 3 of the drawings, the numerous bubbles are indicated by the numeral 48. The beam is shown at 50. The beam intercepts the bubbles that flow through the beam and provides back scattering which returns a reflected scattered beam back to the transmitting element 42. It is preferably switched on and then off so that the pulse transmitted therefrom has a finite duration. It is used as a receiver also. After transmission, it is used in a receiver mode so that the receive signal can be recognized. If desired, separate antennas can be provided for transmitting and receiving, but convenience is usually served by combining the two elements as one. This enables a relatively small structure to be used to measure the flow velocity of the entrained particles. Usually, the entrained particles are carried at the same velocity as the medium in which they are formed. That is, the entrained particles are a good indicator of fluid flow velocity.

The beam as shown in FIG. 2 is therefore directed at an angle with respect to the axis of the cased well, and this angular position of the beam assures that it will intercept an adequate number of bubbles and provide the appropriate backscatter. After the transmitted pulse is formed and the transmitter is switched off, the equipment is switched to a receive mode so that the received signal can be observed at transducer 42 and the received signal is then processed by amplification and subsequent recording.

The transmitted pulse and the received pulse back scattered by the droplets, bubbles, particles, etc. define a difference in frequency which is related to the Doppler shift. The Doppler shift derives from the relative change of position during the transmitted pulse, and it is therefore proportional to the flow velocity. Should the velocity be zero, and should the particles be merely suspended without moving in a zero velocity fluid medium, the equipment will provide an indication that there is no velocity for the particles. On the other hand, it will also provide an indication which is proportionate to the velocity of the produced fluids flowing through the well.

It may be necessary to obtain calibration data. For instance, the tool 10 may be used in a stationary mode, or it can be lowered or raised as required. When lowered or raised during measurements in such circumstances, the measured velocity will have an error equal to the velocity of the sonde 10 during measurements. If the velocity of the sonde 10 is known, that factor can be removed from the data by simple arithmetic to delete that velocity component. In use of the present system, the velocity of the flowing fluid and the droplets are typically the same. This is especially so where the fluid production continues for an interval and the entrained bubbles, droplets, etc. are carried there along and are produced at a fairly stabilized rate which is approximately proportional to the rate at which well fluids are recovered. While it may be important to separate oil from water and sand at the surface, the mixture which is observed in the well from production is valuable in that the mixture provides an indication of velocity as a result of the entrained particles and droplets. Because of the differences at the interface between the materials, backscatter occurs and the transducer 42 is thus used as a receiver element.

The present invention supports the instrument circuitry within the sonde 10 as shown in FIG. 1. That is connected so that both transmitter and receiver are enabled to operate through the transducer 42. If desired, additional transmitter and/or receiver transducers are also included at other angles on the rotatable hub 40. Alternatively to using a motor to rotate a single transducer, several transducers may be mounted on the hub 40. This eliminates the motor mechanism at the expense of reducing the resolution of the measurements.

The equation given below correlates the velocity measurements to the frequency measurements. That is, velocity can be determined by the use of this equation resulting from the frequency measurements made on the transmitted signal and received signal. The equation shows how the transmitted and received signals differ in frequency as a result of the frequency shift derived from the Doppler effect. This data of course is collected as a function of depth and is subsequently recorded at the surface on the recorder 26 and is available for later careful diagnostics and analysis.

Figure 4:
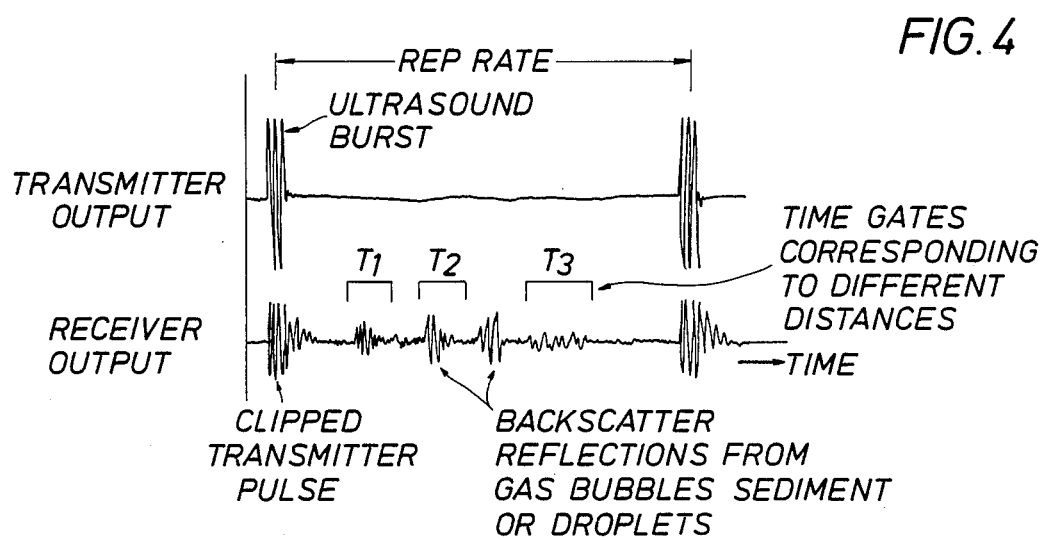
FIG. 4 is a transmitter and receiver timing chart.

Typically, the present apparatus operates at a frequency of from about 500 kilohertz to about 2 megahertz, and is a pulsed system. Typically, the transmitted pulse is from perhaps 2 to about 20 microseconds in length. After the transmitted pulse is formed, an interval is permitted for the received pulse to return. The typical duty cycle involves formation of a pulse of the duration just mentioned and a pause for an interval of up to perhaps 40 microseconds. The duty cycle can be relatively small that is, the transmitters on only a small percentage of the time. The pulse repetition rate, i.e. the spacing between adjacent transmitted pulses, can be varied so that the pulses are perhaps every 50 microseconds to every 500 microseconds. By choosing the pulse rate or time interval at which the frequency comparison is made, the velocity of scatters at different distances from the transducer can be determined. Thus, a profile of scattering velocity across the well borehole can be determined. This is one reason for the use of a pulsed Doppler system. This is exemplified in FIG. 4 and the Doppler frequency shift relates to velocity in the following equation:

$$\Delta f = \frac{2f}{c}(V_T + V_S)$$

In the foregoing, $\Delta f$ is the shift in frequency between the transmitted and received signals, c is the speed of sound in the fluid, $V_T$ is tool velocity and $V_S$ is the desired velocity of the scattering particles.

Attenuation of the ultrasonic energy can be used in fluid identification. For example, backscatter reflections from gas bubbles are generally larger than reflections from sediment or oil-water emulsions. Also, gas bubbles attenuate ultrasonic energy more than sediment or emulsion. Reflections from the wall of the casing or pipe can be used for casing diameter and corrosion measurements.

Several types of ultrasonic pulsed Doppler approaches can be utilized for signal generation and processing depending on the requirements of the desired velocity measurements. One such technique uses random signals to enhance both range and velocity resolution. (C. P. Jethwa M. Kaveh, G. R. Cooper and F. Saggio, Blood Flow Measurements Using Ultrasonic Pulsed Random Signal Doppler System, IEEE Trans. on Sonics and Ultrasonics. V. SV-22, No. 1, 1-11, 1975). IEEE Trans. on Sonics and Ultrasonics. V. SV-22, No. 1, 1-11, 1975). Transducer frequency can be adjsuted so that variations in fluid attenuation can be accommodated.

While the foregoing is diected to the preferred embodiment, the scope thereof is determined by the claims which follow.

What is claimed is:

1. For use in a well borehole, a fluid flow measuring apparatus comprising:
   (a) a tool housing adapted to be lowered into a flowing well on a logging cable extending into the well;
   (b) means for centering said housing in the flowing well to direct well fluid adjacent to said housing into an annular flow space around said housing;
   (c) ultrasonic pulse transmitter means supported by said housing to transmit a pulse downwardly from said housing into fluid flowing in said well so that the pulses transmitted thereby are exposed to reflective entrained surfaces in the flowing fluid for reflection thereby; and
   (d) pulse receiving means supported by said housing for receiving reflected pulses from entrained surfaces in the flowing fluid wherein the pulses so received encode fluid velocity in a Doppler shift.

2. The apparatus of claim 1 wherein said centering means comprises radially outwardly extending springs for engaging the pipe defining the well, and said springs centralize said housing to define the annular flow space.

3. The apparatus of claim 2 wherein similar upper and lower centering means are included and are located at the upper and lower ends of said housing.

4. The apparatus of claim 1 wherein said housing is an elongate cylindrical structure having upper and lower ends, and further including motor driven means for rotating at the lower end thereof wherein said rotating means supports said ultrasonic pulse transmitter means for directing an ultrasonic pulse downwardly from said housing.

5. The apparatus of claim 1 wherein multiple transducers are located on a fixed support and transmit and receive signals from the tool housing.

6. The apparatus of claim 1 wherein said motor rotates said transmitter means for forming pulses transmitted in multiple directions with respect to an axis along the pipe defining the well borehole.

7. The apparatus of claim 6 wherein said motor means is mounted along a center line axis of said housing and said rotating means is located at the lower end of said housing to support and rotate said transmitter means.

8. The apparatus of claim 7 further including a single transducer serving as said ultrasonic pulse transmitter means and said pulse receiving means.

9. The application of claim 8 wherein said means for rotating is supported in said housing and is connected to said motor means.

10. For a well flowing a fluid along the well, a method of measuring fluid flow velocity in the well comprising the steps of:
    (a) lowering an ultrasonic pulse forming means into a flowing well to a depth at which fluid flow velocity measurements are made;
    (b) at the selected depth in the flowing well, transmitting an ultrasonic pulse into the flowing fluid for reflective scattering by the flowing fluid;
    (c) receiving the reflected pulse after transmission wherein the reflected pulse encodes a fluid velocity dependent Doppler shift; and
    (d) selective choosing time intervals in which Doppler shifts are measured so that a scattering velocity profile is determined.

11. The method of claim 10 further including the step of holding the pulse forming means vertically stationary during measurement of fluid flow velocity.

12. The method of claim 10 further including the step of moving the pulse forming means at a known velocity during mneansurement of fluid flow velocity, and removing the velocity of the pulse forming means to obtain fluid flow velocity.

13. The method of claim 10 further including the step of centering the pulse forming means in the well to create a surrounding annular flow space for the well fluid.

14. The method of claim 10 further including the step of repeating the measurements at different depths in the well.

15. The method of claim 10 further including the step of repeating the measurements while directing the pulse downwardly at different angles.

16. The method of claim 10 further including the step of periodically and repetitively transmitting pulses downwardly in the well to sweep through the cross sectional area of the well to intercept the flowing fluid.

17. For a well flowing a fluid along the well, a method of measuring fluid flow velocity in the well comprising the steps of:
    (a) lowering an ultrasonic pulse forming means into a flowing well to a depth at which fluid flow velocity measurements are made;
    (b) at the selected depth in the flowing well, transmitting an ultrasonic pulse into the flowing fluid for reflective scattering by the flowing fluid;
    (c) receiving the reflected pulse after transmission wherein the reflected pulse encodes a fluid velocity dependent Doppler shift; and
    (d) receiving the reflected pulse and using the amplitude and attenuation thereof to identify the flowing fluid causing scattering.

* * * * *